US008483096B2

(12) United States Patent
Vahdat et al.

(10) Patent No.: US 8,483,096 B2
(45) Date of Patent: Jul. 9, 2013

(54) SCALABLE COMMODITY DATA CENTER NETWORK ARCHITECTURE

(75) Inventors: Amin Vahdat, Poway, CA (US); Mohammad Al-Fares, San Diego, CA (US); Alexander Loukissas, San Diego, CA (US)

(73) Assignee: The Regents of the University of California, La Jolla, CA (US)

( * ) Notice: Subject to any disclaimer, the term of this patent is extended or adjusted under 35 U.S.C. 154(b) by 276 days.

(21) Appl. No.: 12/177,860

(22) Filed: Jul. 22, 2008

(65) Prior Publication Data

US 2010/0020806 A1    Jan. 28, 2010

(51) Int. Cl.
 *H04L 12/28* (2006.01)
(52) U.S. Cl.
 USPC ............... 370/256; 370/395.21; 370/395.31
(58) Field of Classification Search
 USPC ..................................... 370/256, 395.31
 See application file for complete search history.

(56) References Cited

U.S. PATENT DOCUMENTS

| | | | | |
|---|---|---|---|---|
| 5,265,207 A * | 11/1993 | Zak et al. | ........................ | 712/15 |
| 6,046,978 A * | 4/2000 | Melnik | ........................ | 370/221 |
| 6,449,667 B1 * | 9/2002 | Ganmukhi et al. | ............. | 710/28 |
| 6,538,416 B1 * | 3/2003 | Hahne et al. | ................... | 370/431 |
| 6,892,237 B1 * | 5/2005 | Gai et al. | ...................... | 709/224 |
| 7,292,542 B2 * | 11/2007 | Wright | ........................ | 370/256 |
| 7,424,489 B1 * | 9/2008 | Duffield et al. | ........ | 707/999.104 |
| 7,463,588 B1 * | 12/2008 | Tanaka et al. | ................... | 370/238 |
| 7,646,734 B2 * | 1/2010 | Wright | .......................... | 370/256 |
| 7,774,461 B2 * | 8/2010 | Tanaka et al. | ................ | 709/224 |
| 7,830,905 B2 * | 11/2010 | Scott et al. | ..................... | 370/419 |
| 8,160,063 B2 * | 4/2012 | Maltz et al. | .................... | 370/389 |
| 8,184,626 B2 * | 5/2012 | Scott et al. | ..................... | 370/362 |
| 8,223,634 B2 * | 7/2012 | Tanaka et al. | ................... | 370/229 |
| 2004/0190526 A1 * | 9/2004 | Kumar et al. | ............ | 370/395.21 |
| 2005/0135380 A1 | 6/2005 | Sahita et al. | | |
| 2005/0180447 A1 * | 8/2005 | Lim et al. | ...................... | 370/432 |
| 2007/0006229 A1 | 1/2007 | Moore | | |
| 2008/0162732 A1 | 7/2008 | Ballew | | |
| 2010/0306408 A1 * | 12/2010 | Greenberg et al. | ........... | 709/238 |

OTHER PUBLICATIONS

Al-Fares, Loukissas, and Vahdat, "A Scalable, Commodity Data Center Network Architecture", Oct. 2008, ACM SIGCOMM, vol. 38, p. 63-74.*

Patent Cooperation Treaty (PCT) International Search Report, PCT/US2008/070908, Notification of Transmittal of The International Search Report and The Written Opinion of The International Searching Authority, or the Declaration, mail date Oct. 8, 2008, 10 pages.

(Continued)

*Primary Examiner* — Dang Ton
*Assistant Examiner* — Brian O Connor
(74) *Attorney, Agent, or Firm* — Mintz Levin Cohn Ferris Glovsky and Popeo, P.C.

(57) ABSTRACT

Systems and methods for routing packets within a network are provided. A packet is received at a switch coupled to a plurality of switches. The switch determines, from a first level table comprising a plurality of prefixes, a prefix matching a first portion of a destination address of the received packet. The switch also determines, from a second level table comprising a plurality of suffixes, a suffix matching a second portion of a destination address of the received packet, when the matching prefix of the first level table is associated with the second level table. The switch forwards, based on the first level table and the second level table, the received packet to an output port of the switch. The switches are configured as a fat-tree network.

20 Claims, 7 Drawing Sheets

OTHER PUBLICATIONS

Charles Clos et al., "A Study of Non-Blocking Switching Networks", *Bell System Technical Journal*, 32(2), 1953.; pp. 406-425.

Charles E. Leiserson et al., "Fat-Trees: Universal Networks for Hardware-Efficient Supercomputing", *IEEE Transactions on Computers*, vol. c-34, No. 10, Oct. 1985, pp. 892-901.

Juniper J-Flow., "Network Routing Products—Secure Router Solution—Juniper Networks", http://www.juniper.net/techpubs/software/erx/junose61/swconfig-routing-vol1/html/ip-jflow-stats-config2.html.: *Juniper Networks, Inc.*; pp. 1 and 2, 2008.

SGI Developer Central Open Source Linux XFS, "XFS: A High-performance Journaling Filesystem", http://oss.sgi.com/projects/xfs/; pp. 1-4, 2007.

M. Blumrich et al., "Design and Analysis of the BlueGene/L Torus Interconnection Network", *IBM Research Report RC23025 (W0312-022)*, Dec. 3, 2003, pp. 1-9.

Nanette J. Boden et al., "Myrinet—A Gigabit-per-second Local Area Network", *Micro, IEEE*, to appear Feb. 1995, draft Nov. 16, 1994, pp. 1-15.

"Cisco Data Center Infrastructure 2.5 Design Guide" http://www.cisco.com/univercd/cc/td/doc/solution/dcidg21.pdf; *Cisco Systems, Inc.*; Cisco Validated Design I, Dec. 6, 2007, pp. 40 pgs.

Sergey Brin et al., "The Anatomy of a Large-scale Hypertextual Web Search Engine", *Computer Networks and ISDN Systems*, 1998, 20 pgs.

Razvan Cheveresan et al., "Characteristics of Workloads used in High Performance and Technical Computing", *ACM International Conference on Supercomputing*, 2007, pp. 73-82.

Lawrence Chisvin et al., "Content-Addressable and Associative Memory: Alternatives to the Ubiquitous RAM", *Computer IEEE*, 22 (7):51-64, Jul. 1989, pp. 51-63.

B. Claise, "Cisco Systems NetFlow Services Export Version 9", http://www.cse.ucsd.edu/~malfares/references/10.txt, RFC 3954, Internet Engineering Task Force, Oct. 2004, pp. 1-29.

Jeffrey Dean et al., "MapReduce: Simplified Data Processing on Large Clusters," *OSIDI*, 2004, pp. 1-13.

Giuseppe DeCandia et al., "Dyanamo: Amazon's Highly Available Key-value Store," *SOSP*, Stevenson, Washington, USA; Oct. 14-17, 2007, pp. 205-220.

Allen B. Downey, "Evidence for long-tailed distributions in the Internet," Wellesley College, Computer Science Department, 13 pgs, 2001.

Will Eatherton et al., "Tree Bitmap: Hardware/ Software IP Lookups with Incremental Updates," *ACM SIGCOMM Computer Communications Review*, vol. 34, No. 2, Apr. 2004, pp. 97-122.

S. Ben Fredj et al., "Statistical Bandwidth Sharing: A Study of Congestion at Flow Level," *SIGCOMM*, San Diego, CA, Aug. 27-31, 2001, pp. 111-122.

Sanjay Ghemawat et al., "The Google File System," *SOSP*, Bolton Landing, New York, Oct. 19-22, 2003, 15 pgs.

C. Hopps, "Analysis of an Equal-Cost Multi-Path Algorithm," http://www.cse.ucsd.edu/~malfares/references/19.txt, RFC 2992, Nov. 2000, pp. 1-8.

D. Katz, "BFD for IPv4 and IPv6 (Single Hop)," http://www.cse.ucsd.edu/~malfares/references/20.txt, Internet Draft, Mar. 2008, pp. 1-8.

Eddie Kohler et al., "The Click Modular Router," MIT, Laboratory for Computer Science, pp. 1-34, Jul. 2000.

Charles E. Leiserson et al., "The Network Architecture of the Connection Machine CM-5," Thinking Machines Corporation, Mar. 21, 1994, pp. 1-16.

John W. Lockwood et al., "NetFPGA—An Open Platform for Gigabit-rate Network Switching and Routing," *IEEE International Conference on Microelectronic Systems Education (MSE)*, Jun. 3-4, 2007, pp. 1-2.

J Moy, "OSPF Version 2," http://www.cse.ucsd.edu/malfares/references/25.txt, RFC 2328, Apr. 1998, pp. 1-69.

V. Srinivasan et al., "Fast Address Lookups Using Controlled Prefix Expansion," *ACM Transactions on Computer Systems*, vol. 17, No. 1, Feb. 1999, pp. 1-40.

D. Thaler, "Multipath Issues in Unicast and Multicast Next-Hop Selection," http://www.ucsd.edu/~malfares/references/30.txt, RFC 2991, Nov. 2000, pp. 1-8.

Lewis W. Tucker et al., "Architecture and Applications of the Connection Machine," *IEEE*, Aug. 1988 pp. 26-38.

Jeffrey S. Vetter et al., "Early Evaluation of the Cray XT3," *IEEE*, 2006, 10 pgs.

Michael Woodacre et al., "The SGI Altix 3000 Global Shared-Memory Architecture," *SGI*, 2003, 11 pgs.

SUN Datacenter Switch 3456 System Architecture, "Massively Scalable InfiniBand Switch Architecture for Petascale Computing," Nov. 2007, 42 pgs.

"Server Cluster Designs with Ethernet," Cisco Data Center Infrastructure 2.5 Design Guide OL-11565-01, Chapters 3,4, 5,6, 7, and 8, 140 pgs, 2007.

InfiniBand Architecture Specification, vol. 1, Release 1.0a, Jun. 19, 2001, 913 pgs.

Frank Schmuck et al., "GPFS: A Shared-Disk File System for Large Computing Clusters", Proceedings of the Conference on File and Storage Technologies (FAST '02), Jan. 28-30, 2002, Monterey, CA, pp. 231-244.

\* cited by examiner

SCALABLE COMMODITY DATA CENTER NETWORK ARCHITECTURE

FIELD

The subject matter described herein relates to networking.

BACKGROUND

A data center is a collection of one or more computers providing one or more functions. A data center, such as a so-called "server farm" can include tens, hundreds, or thousands of computers interconnected to provide functions, such as searching, storage, web-based hosting, email servers, transaction processing (e.g., credit checks, credit card transactions, etc.), web-based ad placement, and the like. For example, a company, such as Google, may have a data center at a facility, which includes thousands of interconnected computers to provide the processing behind Google's search engine.

Typically, the computers are organized into some form of architecture or topology. Since there can be thousands of computers in a large data center, the typical topology implements cheaper, lower capacity switches (so-called "edge" switches) to connect directly to the computers. The traffic from those edge switches is typically aggregated and switched using fewer but more expensive, higher capacity switches. The topology thus allows any given computer in the data center to access (e.g., send and receive packets) another computer in the data center.

SUMMARY

The subject matter disclosed herein provides methods and apparatus for routing packets within a network, such as a fat-tree network.

In one aspect, there is provided a method. The method may include receiving a packet at a switch coupled to a plurality of switches. The switch may determine, from a first level table comprising a plurality of prefixes, a prefix matching a first portion of a destination address of the received packet. The switch may also determine, from a second level table comprising a plurality of suffixes, a suffix matching a second portion of a destination address of the received packet, when the matching prefix of the first level table is associated with the second level table. The switch may forward, based on the first level table and the second level table, the received packet to an output port of the switch.

In one aspect, there is provided a switch configured to receive one or more packets. The switch may be coupled to a plurality of switches configured as a pod of a fat-tree network. The switch may be further configured to forward the one or more packets based on a first level table and a second level table.

In another aspect, there is provided a network. The network may include a plurality of switches configured as a fat-tree network. The fat-tree network may provide communications to a cluster of computers at a data center, each of the plurality of switches including a substantially similar configuration with respect to a quantity of ports per switch and a capacity of each of the ports.

In another aspect, there is provided a system. The system may include a plurality of switches configured as a network providing a plurality of paths to a cluster of computers at a data center. The plurality of switches may be configured to deliver, from a source to a destination, a plurality of packets in order on a per flow basis, and the plurality of switches configured to distribute flows among the plurality of paths.

The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Figure 1:
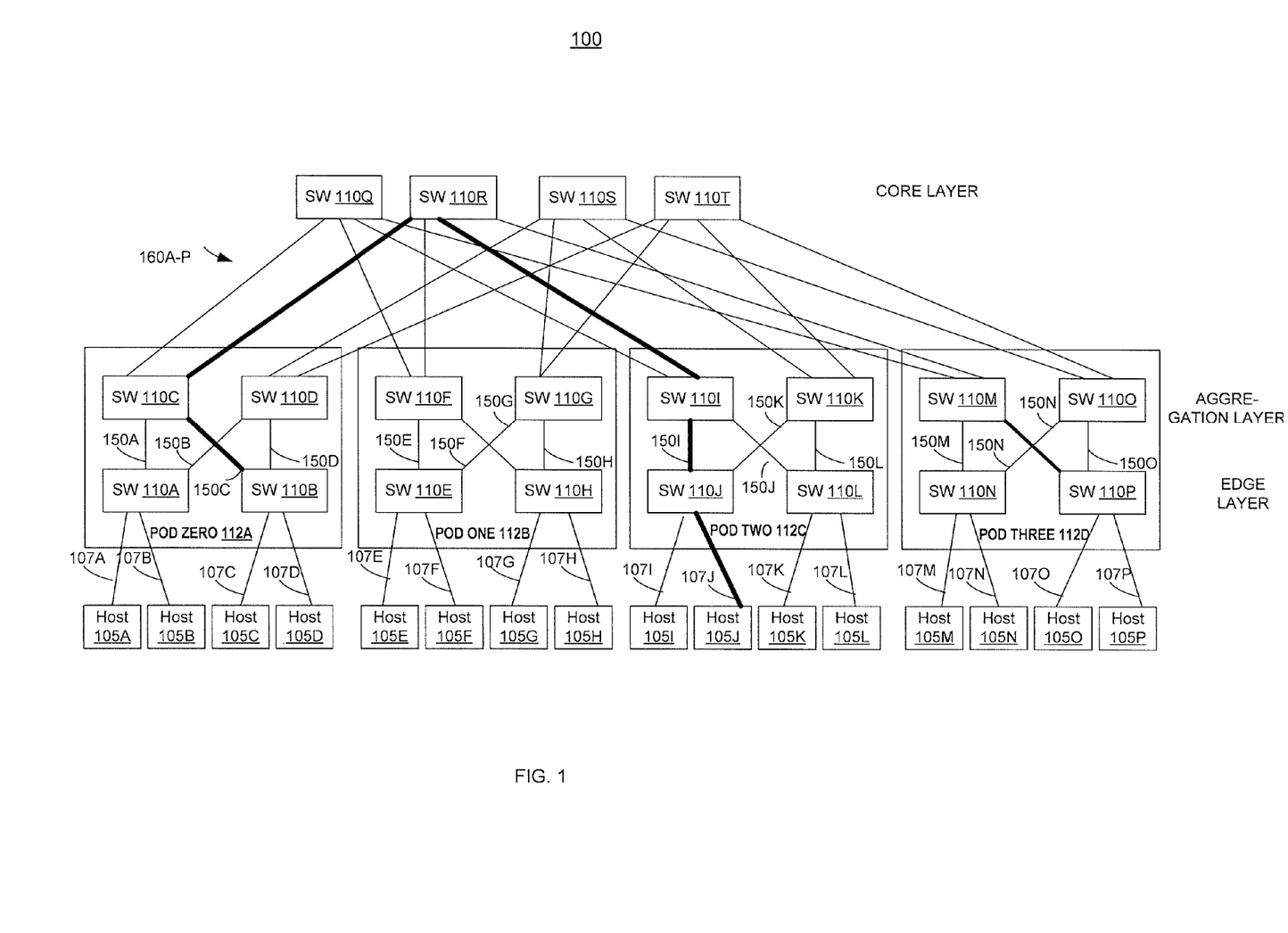
FIG. 1 depicts a block diagram of a fat-tree network.

FIG. 1 depicts a network 100 including a plurality of hosts 105A-P coupled to switches 110A-T via communication links, such as communication links 107A-P, 150A-O, and 160A-P. Each of the hosts 105A-P may be implemented as one or more of the following: a processor, a computer, a blade, a server, and the like. The switches 110A-T enable communications among any of the hosts 105A-P. The network 100 is implemented using a fat-tree topology. Moreover, the fat-tree network 100 of FIG. 1 may be used in various applications, one of which is as a mechanism to couple a cluster of computers (e.g., the computers of a data center). In some embodiments, the fat-tree network 100 includes a two-level routing table (described further below) for routing traffic in a fat-tree network. Furthermore, the fat-tree network 100 may also include a flow classifier (described further below) for preventing the reordering of a stream of packets. In some embodiments, the fat-tree network 100 may include a flow scheduler (described further below) for scheduling long (or large) flows of packets. The fat-tree network 100 may include, in some embodiments, a fault mechanism (as described further below).

The switches 110A-T may be implemented as any type of device for switching (e.g., routing) a packet from an input port of the switch to an output port of the switch. In some implementations, the switch is implemented as a device that performs layer 2 switching (e.g., which forwards a packet based on a media access control (MAC) layer address), layer 3 switching (also referred to as layer 3 routing, which forwards a packet based on an Internet Protocol (IP) address as well as other layer 3 information), or a combination of both layer 2 and 3. For example, each of the switches 110A-T may be implemented as a commercially available Gigabit Ethernet switch, although any other router, switch, and the like may be used. Moreover, each of the switches 110A-T may be configured with the similar features, such as number of ports per switch and the bandwidth per port. For example, each of the switches 110A-T may be implemented using 4-port Gigabit switches, each of which has at least 4-ports available. In some embodiments, the fat-tree network 100 enables the switches 110A-T to be implemented using a plurality of relatively low-cost "commodity" (e.g., relatively low cost or commonly used) switches rather than using a network topology requiring relatively higher-cost, high-speed switches at higher layers, such as the aggregation layer and the core layer.

The communication links 107A-P, 150A-O, and 160A-P provide links (or paths) between a source and a destination. For example, a typical implementation of communication links 107A-P, 150A-O, and 160A-P is direct copper or fiber optic links providing bidirectional communications. The communication links 107A-P, 150A-O, and 160A-P may be implemented, however, using other media and using unidirectional (e.g., doubling the ports at each switch), dedicated, and/or shared (e.g., networked) communication links as well. Moreover, communication links 107A-P, 150A-O, and 160A-P may include, alone or in any suitable combination, one or more of the following: fiber optic connections, a local area network (LAN), a wide area network (WAN), a dedicated intranet, a wireless LAN, the Internet, an intranet, a wireless network, a wired network, a bus, or any other communication mechanisms.

The fat-tree network 100 is referred to as a k-ary fat-tree, where k represents the number of pods in the fat-tree network 100 (although k may also represent the number of ports in each of the similarly configured switches of a pod). In the example of FIG. 1, there are four pods 112A-D, so k has the value of 4 (i.e., a 4-ary fat-tree). Although FIG. 1 depicts a 4-ary fat-tree, other sizes of fat-tree networks may be implemented as well. Indeed, in some implementations, a 48-ary fat-tree network is implemented configured with 48-pods, each of which has 48 switches, supporting 27,648 hosts (e.g., for use in a data center). Moreover, all of the switches of the 48-ary fat-tree network can be implemented with similar switches (e.g., the number of ports per switch and capacity of the switches at the edge layer are similar (if not the same) as the number of ports per switch and capacity of the switches at the core layer and aggregation layer).

Furthermore, each of the pods of a fat-tree network includes two layers, each layer having k/2 switches. Returning to the 4-ary fat-tree network 100 at pod zero 112A, the first layer (which is also referred to as an edge layer) includes two (2) switches 110A-B, and the second layer (which is also referred to as an aggregation layer) includes switches 110C-D. The other pods 112B-D are similarly configured with switches in an edge layer and an aggregation layer.

Moreover, for a given pod in a fat-tree network, each switch in the edge layer includes k-ports, half of which are directly connected to k/2 hosts and the remaining two ports are connected to a switch in the aggregation layer of the given pod. Referring to fat-tree network 100, switch 110A includes four ports, two of which are coupled to two hosts 105A-B via links 107A-B and the remaining two ports coupled via links 150A-B to switches 110C-D of the aggregation layer. The other pods 112B-D are similarly configured, as depicted at FIG. 1.

The fat-tree network 100 also includes $(k/2)^2$ k-port core switches, each of which is connected to every pod. Referring again to fat-tree network 100, it has four core switches 110Q-T, each of which has four ports. Each of the four ports of a core switch is connected to one of the pods. For example, the first port of core switch 110Q is connected via a communication link to pod zero 112A; the second port of core switch 110Q is connected via a communication link to pod one 112B; the third port of core switch 110Q is connected via a communication link to pod two 112C; and the forth port of core switch 110Q is connected via a communication link to pod three 112D.

Furthermore, there are $k*(k/2)^2$ communication links coupled between the core layer and the pods. Referring again to 4-ary fat-tree network 100 (e.g., where k=4), there are 16 communication links 160A-P (e.g., $16=4*(4/2)^2$) coupled between the core layer and the pods 112A-D. Although FIG. 1 depicts a specific implementation of a fat-tree topology, variations to the fat-tree topology 100 (e.g., additional links, additional pods, partial pods, partial core layers, and the like) may be implemented as well.

In some embodiments, the fat-tree network 100 described above is used with two-level routing tables (described below) to reduce the likelihood of significant bottlenecks up and down the fat-tree network, which would significantly limit overall performance. When a bottleneck occurs on a link, the capacity of the overall network is affected. For example, given that a link between switches has a capacity of 1 Gigabit per second and a bottleneck occurs on that link, the use of that link must be limited (e.g., send fewer packets per a given interval of time) to cure the bottleneck. As such, the overall capacity of the network is affected.

Moreover, the two-level routing tables distribute the outgoing traffic from any given switch to reduce the likelihood of a bottleneck. In some implementations and certain communication patterns, the two-level routing tables may provide a maximum bisection bandwidth in fat-tree network 100. The bisection bandwidth refers to the bandwidth associated with all of the links from one layer to the next. For example, if links 160A-P each has a 1 Gigabit per second capacity, the maximum bisection bandwidth is 16 Gigabits per second.

In some embodiments, the switches utilize the first and second level tables when forwarding packets in a so-called "upward" direction (e.g., towards a higher level switch, such as an aggregation and core switches). However, the switches use only the first level table (i.e., the second level table is not used) when packets are forwarded in a so-called "downward" direction (e.g., away from the aggregation and core switches).

As noted above, a switch configured with the two-level routing tables described herein distributes packets among the switch's output ports. For example, an edge switch, such as switch 110B, may receive a packet from host 105C. When the received packet has a destination address at host 105D, switch 110B forwards, based on the first level table (e.g., a prefix entry (or prefix) of the first level table will match the left most significant byte(s) of the destination address), the received packet to the destination address via an output port of switch 110B as well as link 107D. In this example, the longest prefix (described further below) matching the destination address will identify the output port to use at switch 110B, and the longest prefix will not have an associated second level table, so the first level table terminates without a corresponding second level table look-up. When the received packet has a destination address of host 105A, switch 110B forwards, based on the first level table and the second level table (e.g., the matching prefix will point to a second level table including suffixes and corresponding output ports), the received packet to an output port (which is mapped in the second level table to the matching suffix) coupled to, for example, link 150C and aggregation layer switch 110C.

When there is a second level table associated with the first level table (e.g., a prefix in the first level table points to the second level table), the switch forwards the received packet to the output port using the second level table (e.g., the second level table including the matching suffix and an output port mapped to that suffix) rather than using the first level table (e.g., the first level table including the matching prefix and an output port mapped to that prefix) to forward the received packet. In other words, the first level table is used to forward packets based on the prefix of the destination address, and the second level table is used to forward packets based on the suffix of the destination address—distributing thus packets among ports to minimize (and, possibly, avoid) bottlenecks.

Although the two-level routing tables are described herein with reference to a k-ary fat-tree network, the two level routing tables (including the first and second level tables) may be used with other types and sizes of networks as well. Moreover, the addresses, prefixes, suffixes, port numbers, and the like are only example values used for illustration.

Figure 2:
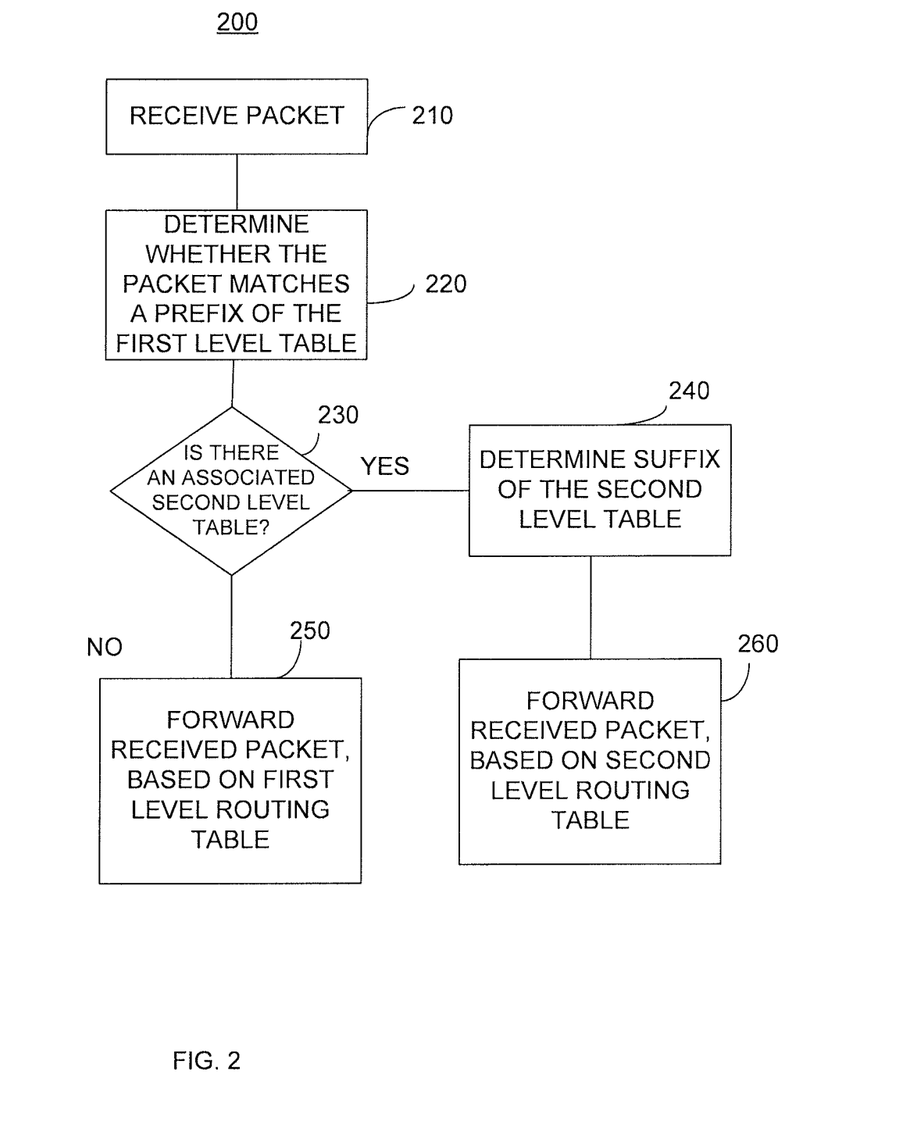
FIG. 2 depicts a process for routing packets using a two-level table comprising a first level table and a second level table.
Figure 3:
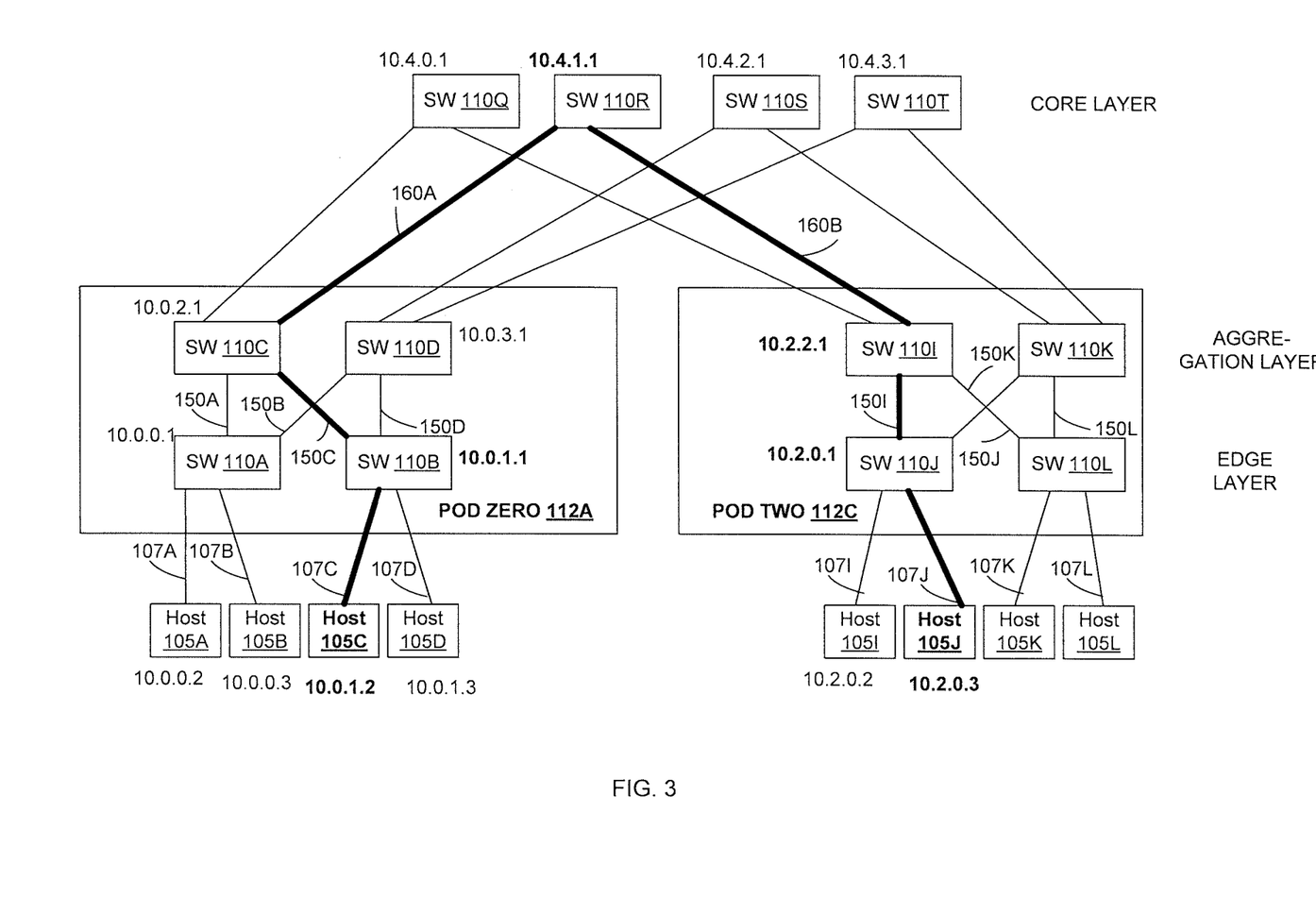
FIG. 3 depicts a simplified version of the fat-tree network depicted at FIG. 1.

FIG. 2 depicts a process 200 for routing using the two-level routing tables (which include the first and second tables). The description of process 200 will refer to FIG. 3. FIG. 3 depicts the fat-tree network 100 simplified to depict the links described in the following example.

FIG. 3 also depicts an addressing scheme, which is used in some of the embodiments described herein. Before process 200 is described, the following provides a description of the exemplary addressing scheme. Each of the switches of a pod (e.g., switches 110A-D) are configured with an address based on the following form: 10.pod.switch.1, where pod denotes the pod number (e.g., pod zero, pod one, and the like to pod (k−1)), and switch denotes the position of that switch in the pod (e.g., between 0 and k−1 starting from left to right, bottom to top). Each of the switches of the core layer is configured with an address of the form 10.k.j.i, where j and i identifies a switch in the core of $(k/2)^2$ switches. The address of a host is configured based on the switch (or subnet) to which it is connected. For example, each of the hosts is configured with addresses of the form: 10.pod.switch.ID, where ID is a host's position within the subnet of the switch (e.g., ID varies between 2 and (k/2)+1), starting from left to right). For example, host 105A is configured with an address 10.0.0.2; host 105B is configured with an address of 10.0.0.3; host 105C is configured with an address 10.0.1.2, and so forth across the remaining hosts as depicted at FIG. 3. The configured addresses are depicted at FIG. 3 to the left of the switches and below the hosts. Although the examples described herein use the above-noted addressing schemes, other addressing schemes may be used as well.

Referring again to FIG. 2, at 210, a switch receives a packet from a host coupled to the switch. For example, switch 110B may receive a packet from host 105C. The received packet may have a source address of 10.0.1.2 and a destination address of 10.2.0.3, which is host 105J at pod two 112C, although the received packet may include other source and destination addresses as well.

At 220, a determination is made whether the received packet includes an address that matches a prefix of a first level table. For example, switch 110B may determine the so-called "longest" prefix that matches the destination address of the received packet. The longest matching prefix represents a prefix that most closely matches the left-most byte(s) of the destination address of the received packet. The prefix entries of the first level table may correspond to the left-most byte(s) of a destination address. Moreover, the one or more prefixes may each map to (e.g., identify) an output port, to which the received packet is forwarded. For example, when a packet received at switch 110B includes a destination address of 10.0.1.2, the prefixes of the first level table may include prefixes of 10, 10.0.0 and 10.0.1. In this example, the longest matching prefix is 10.0.1 (e.g., representing the closest match), and switch 110B may, for example, forward the received packet to an output port at switch 110B coupled to link 107C.

At 230, the switch determines whether prefix determined at 220 has an associated second level table. For example, at least one of the prefixes of the first level table may be associated with (e.g., point to, link, map to, etc.) a second level table including one or more suffix entries. The suffix entries of the second level table may correspond to the right-most byte(s) of a destination address. Moreover, the second level table includes one or more suffixes, each of which points to an output port of the switch. In some embodiments, a suffix may be implemented as the least significant byte(s) of the destination address, such as the host ID portion (described above with respect to the addressing scheme) of the destination address. For example, if the suffix of the second level table is "0.3" and that suffix matches the destination address "10.2.0.3" (with the host ID represented by the "0.3)", the second level table points to output port 3, so that the switch can forward the received packet via output port 3. Given the same suffix of 0.3, another packet with a destination address of 10.1.0.3 is also forwarded to port 3, but a packet with a destination address of 10.1.0.2 might be forwarded to another port, such as port 2 (given another matching suffix "0.2" which maps to output port 2 of the switch). The second level table thus distributes packets among the output ports of the switch based on the host ID in the destination address of the received packet.

In some embodiments, the edge layer switches (e.g., switches 110A, B, J, L and the like) utilize the first and second level tables when forwarding packets in a so-called "upward" direction (e.g., towards a higher level switch, such as an aggregation and core switches). However, the edge switches use only the first level table (i.e., the second level table is not used) when packets are forwarded in a so-called "downward" direction (e.g., away from the aggregation and core switches). The aggregation layer switches operate in a similar manner in that they utilize both a first level table and an associated second level table when forwarding packets upward and use only the first level table when forwarding packets downward. For example, when switch 110B receives a packet with a destination address of 10.0.1.3, switch 110B forwards the received packet using only the first level table to an output port of the switch that is coupled to link 107D and host 105D. When switch 110B receives a packet with a destination address of 10.0.0.3, switch 110B forwards the received packet using the first and second level tables to an output port of the switch that is coupled to link 150C and switch 110C. Similarly, when switch 110B receives a packet with a destination address of 10.2.0.3, switch 110B forwards the received packet using the first and second level tables to an output port of the switch that is coupled to link 150C and switch 110C. In this example, switch 110C is an aggregation layer switch. In the case of switch 110C receiving a packet including destination address of 10.0.0.3, switch 110C determines that there is no associated second level table because the destination address is within the pod (e.g., in a downward direction associated with the subnet of switch 110C). Switch 110C thus forwards, based on the first level table, the received packet (including destination address of 10.0.0.3) to an output port coupled to link 150A and switch 110A. In the case of switch 110C receiving a packet including destination address of 10.2.0.3, switch 110C determines that there is an associated second level table, and switch 110C thus forwards, based on the second level table, the received packet including destination address of 10.2.0.3 to an output port of switch 110C coupled to link 160A and switch 110R, which is external to pod 112A.

When there is an associated second level table, the switch determines a matching suffix (yes at 230 and 240). For example, in the case of switch 110C receiving a packet including destination address of 10.2.0.3, switch 110C determines that there is an associated second level table. The matching suffix of the second level table is ".3," which corresponds to the destination host ID of ".3." In some implementations, the switch 110C determines the matching suffix as the longest matching suffix from the second level table including a plurality of suffixes. The longest matching suffix is the suffix from the second level table that most closely matches the right-most portion of the destination address (e.g., the least significant byte(s)). At 260, switch 110C forwards the received packet based on the second level table (e.g., the matching suffix of the second level table and the output port mapped to that matching suffix). Returning to the above example of switch 110C (which receives a packet including destination address of 10.2.0.3), switch 110C forwards the received packet to an output port at switch 110C, such as output port 3 coupled to link 160A and core layer switch 110R, based on the second level table.

When switch 110C forwards, using a second level table, the received packet with destination address 10.2.0.3 to output port 3 (which is coupled to core layer switch 110R via link 160A), core switch 110R uses a first level table including one or more prefixes to forward the received packet (i.e., from switch 110C) with destination address 10.2.0.3 to a pod. For example, the received packet (e.g., having destination address 10.2.0.3) is forwarded based on the prefix "10.2" to pod two 112C. In the example of FIG. 3, switch 110R forwards the received packet to switch 110I via link 160B. Switch 110I uses a first level table to route the packet to link 150I and switch 110J, which also uses a first level table terminating the route to destination host 105J. As such, the switches in the pod may use first and second tables when routing a packet in a so-called "upward" direction out of the pod and towards the core switches. However, if the received packet is being routed in a so-called "downward" direction from the core layer switches to the destination hosts, the switch may only use the first level table (e.g., without using the suffixes of the second level table).

When there is no associated second level table, the switch forwards the received packet based on the matching prefix determined at 220 (no at 230 and 250). For example, when switch 110B receives a packet with a destination address at 10.0.1.2, switch 110B determines the longest matching prefix as 10.0.1, which corresponds to forwarding the packet to an output port of the switch 110B coupled to link 107C and host 105C. In this example, the prefix 10.0.1 is a terminating prefix of the first level table (i.e., the prefix does not include a link to an associated second level table).

In some embodiments, the process 200 distributes packets among the output ports of a switch to minimize the likelihood of bottlenecks. Specifically, in some implementations, the two-level routing tables (and, more particularly, the suffixes of the second level table) distribute packets among the output ports of a switch in a manner likely to reduce bottlenecks. The two-level routing tables may be implemented as a modification to existing routing tables in the switches. For example, each entry in a switch's main routing table may have a pointer to a relatively small second level table of suffixes and corresponding output ports. A prefix listed in the first level table is considered "terminating" when it does not contain a pointer to a second level table (including suffixes). A second level table may be pointed to by more than one prefix at a first level table. Moreover, the entries in the first level table may be so-called "left-handed" entries (i.e., /m prefix masks of the form $1^m 0^{32-m}$), while entries in the second level table are so-called "right-handed" entries (i.e. /m suffix masks of the form $0^{32-m} 1^m$).

Figure 4:
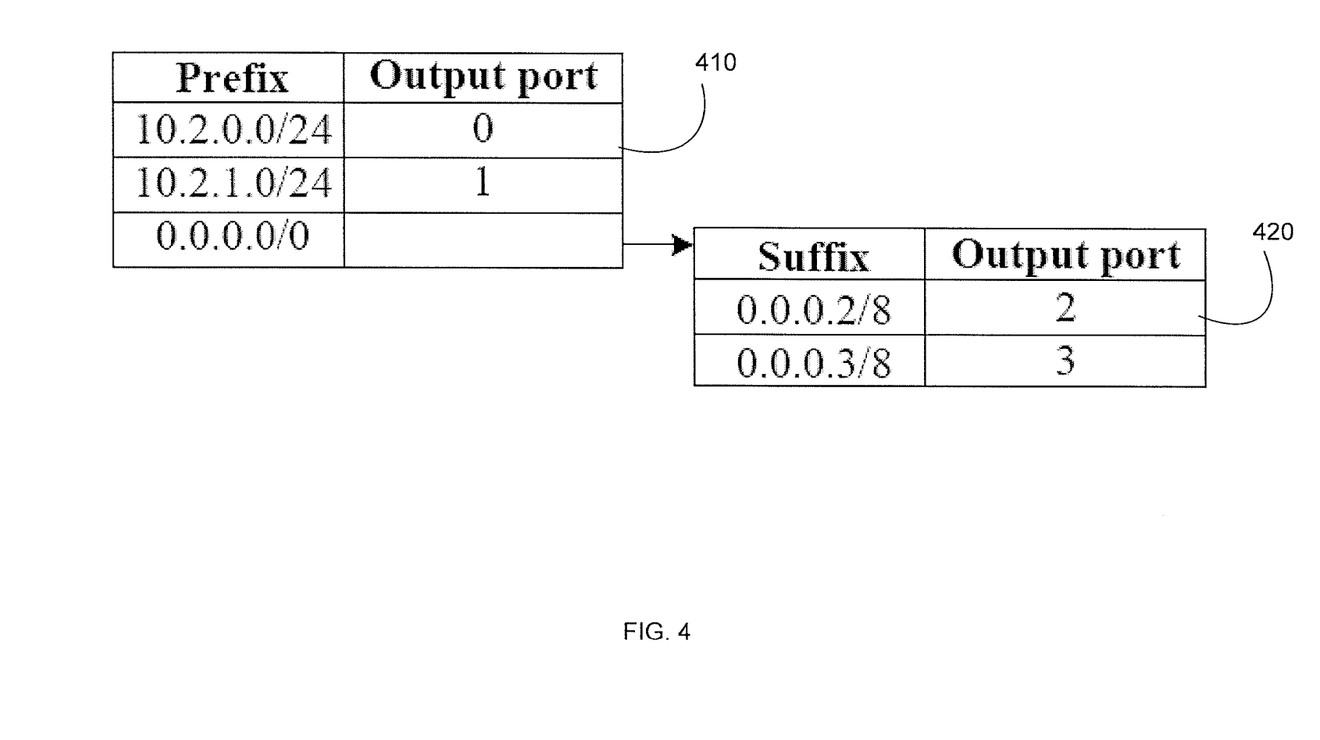
FIG. 4 depicts an example of two-level routing tables.

FIG. 4 depicts an example of two-level routing tables including a first level table 410 and a second level table 420. The first and second tables 410-420 are associated with switch 110I, which in this example has an address of 10.2.2.1. When switch 110I receives a packet with a destination IP address of 10.2.1.2, the received packet matches the prefix "10.2.1.0/24" at first level table 410 and thus forwards the received packet on output port "1." When switch 110I receives a packet with a destination IP address of 10.3.0.3, the received packet does not match the prefixes "10.2.0.0/24" and "10.2.1.0/24" of first level table 410. The so-called "matching" prefix "0.0.0.0/0" serves as a default value that points to the second level table 415, where the suffix "0.0.0.3/8" matches host ID ".3" of destination address 10.3.0.3. The suffix "0.0.0.3/8" indicates that the received packet with the destination address 10.3.0.3 is forwarded to output port 3 at switch 110I. The switch 110I thus forwards the packet to output port 3. Switches 110A-P also include first and second tables, which are similar to those described above with respect to FIG. 4, while core switches 110Q-T include a first level table, such as first level table 410.

The first and second tables of the two-level routing tables may be implemented in the switch in a variety of ways. For example, the first and second tables 410 and 420 may be implemented using a Content-Addressable Memory (CAM), a Ternary CAM (TCAM), and the like. A CAM can perform parallel searches among all its entries in a single clock cycle. A TCAM is a type of CAM that can store do not care bits (e.g., "x.x.x") and match 0's and 1's in particular positions, making it suitable for storing variable length prefixes, such as the ones found in routing tables.

Figure 5:
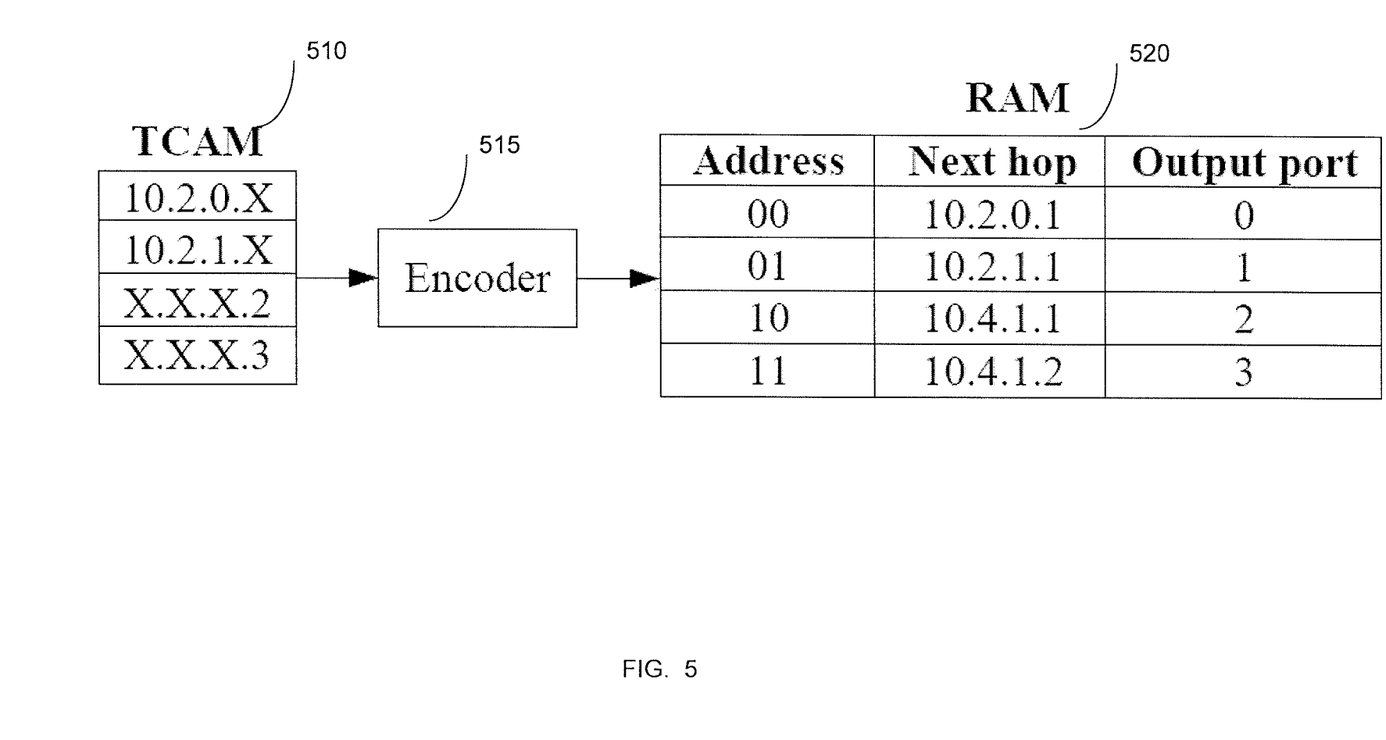
FIG. 5 depicts an example implementation of the two-level routing tables.

FIG. 5 depicts an example implementation of the two-level routing tables using a TCAM. The TCAM 510 stores address prefixes and suffixes, which in turn indexes a RAM (random access memory) 520 storing the IP address of the output port and the next hop (e.g., given the packet is sent via the output port, the IP address of the next hop). The TCAM 510 stores the prefixes (e.g., the left-handed entries, such as "10.2.0.X" and "10.2.1.X") in numerically smaller addresses and suffixes (e.g., right-handed entries, such as "X.X.X.2" and "X.X.X.3") in larger addresses. The encoder 515 encodes the output of the TCAM 510, so that the entry with the numerically smallest matching address is output. This satisfies one of the semantics of the two-level lookup (e.g., when the destination IP address of a packet matches both a left-handed and a right-handed entry, then the left-handed entry (i.e., internal to the pod or in the same subnet) is chosen). For example, a packet with destination IP address 10.2.0.3 matches the left-handed entry 10.2.0.X and the right-handed entry X.X.X.3, but the encoder correctly outputs RAM address "00." The RAM address "00" corresponds to port 0, which is a destination within the pod. However, a packet with destination IP address 10.3.1.2 matches only the right-handed entry X.X.X.2, and, as such, the encoder 515 outputs RAM address "10", which corresponds to port 2, so that packet is forwarded via output port 2.

As described above, the first level table of each of the switches, in a given pod, is assigned terminating prefixes within a given pod. For inter-pod traffic (e.g., packet traffic between pods), the first level table of the aggregation layer switch includes a prefix (e.g., the "0.0.0.0/0" prefix) with a pointer to a second level table, which matches on suffixes (e.g., the host ID of the destination address).

Although the first and second tables for the aggregation layer switches (e.g., switches 110C, D, I, K, and the like) can be generated in a variety of ways, Table 1 below depicts pseudo-code for generating the routing tables for each of the aggregation switches of each pod. The pseudo code of Table 1 assumes the addressing scheme described above.

TABLE 1

PSEUDO-CODE FOR GENERATION OF FIRST AND SECOND LEVEL ROUTING TABLES FOR AGGREGATION LAYER SWITCHES.

| Line number | Pseudo-Code |
|---|---|
| 1 | foreach pod x in [0, k – 1] do |
| 2 |   foreach switch z in [(k/2), k – 1] do |
| 3 |     foreach subnet i in [0, (k/2) – 1] do |
| 4 |       addPrefix(10.x.z.1, 10.x.i.0/24, i); |
| 5 |     End |
| 6 |     addPrefix(10.x.z.1, 0.0.0.0/0, 0); |
| 7 |     foreach host ID i in [2, (k/2) + 1] do |
| 8 |       addSuffix(10.x.z.1, 0.0.0.i/8, (i – 2 + z)mod(k/2) + (k/2)); |
| 9 |     End |
| 10 |   End |
| 11 | End |

Although the first and second level tables for the edge layer switches (e.g., switches 110A, B, J, and L) can be generated in a variety of ways, Table 2 below depicts pseudo code for the generation of first and second level routing tables for each of the edge layer switches of each pod. The pseudo code of Table 2 also assumes the addressing scheme described above.

TABLE 2

PSEUDO-CODE FOR GENERATION OF FIRST AND SECOND LEVEL ROUTING TABLES FOR EDGE LAYER SWITCHES.

| Line number | Pseudo-Code |
|---|---|
| 1 | foreach pod x in [0, k – 1] do |
| 2 |   foreach switch z in [(k/2), k – 1] do |
| 6 |     addPrefix(10.x.z.1, 0.0.0.0/0, 0); |
| 7 |     foreach host ID i in [2, (k/2) + 1] do |
| 8 |       addSuffix(10.x.z.1, 0.0.0.i/8, (i – 2 + z)mod(k/2) + (k/2)); |
| 9 |     End |
| 10 |   End |
| 11 | End |

Since the fat-tree network topology described herein defines that each core switch is connected to every pod (e.g., port i of a core switch is connected to pod i), the core switches are, in some embodiments, only assigned terminating prefixes pointing to the destination pods, as shown in Table 3. Although the first level tables for the core layer switches (e.g., switches 110Q-T) can be generated in a variety of ways, Table 3 below depicts pseudo code for the generation of the first level table for each of the core layer switches. The pseudo code of Table 3 also implements the addressing scheme described above.

TABLE 3

PSEUDO CODE FOR GENERATION OF FIRST LEVEL ROUTING TABLES FOR CORE LAYER SWITCHES.

| Line number | Pseudo-Code |
|---|---|
| 1 | foreach j in [1, (k/2)] do |
| 2 |   foreach i in [1, (k/2)] do |
| 3 |     foreach destination pod x in [0, (k/2) – 1] do |
| 4 |       addPrefix(10.k.j.i,10.x.0.0/16, x); |
| 5 |     End |
| 6 |   End |
| 7 | End |

To further illustrate network operation using the two-level routing tables, the following provides an example of the routing decisions for a packet sent from source host 105C (e.g., with an IP address of 10.0.1.2) to a destination host 105J (e.g., with an IP address of 10.2.0.3). Referring to FIG. 3, first the edge switch 110B coupled to host 105C uses the first and second level tables to determine that the received packet should be forwarded to a higher-level aggregation switch, such as switch 110C (e.g., a matching prefix "0.0.0.0/0" points to a second level table including a matching suffix identifying the output port of switch 110B, which is coupled to link 105C and switch 110C). When switch 110C receives the received packet, the first level table will include a matching prefix to a second level table (e.g., the "0.0.0.0/0" prefix points to the second level table). The switch 110C then uses the matching suffix in the second level table (e.g., matches the suffix to the host ID of the destination address, which in this example is ".3") to forward the received packet to an output port coupled to a core switch that is outside of the pod. For example, the matching suffix in the second level table is mapped to an output port of switch 110C. Specifically, forwards the received packet on, for example, port 3 connected to core switch 110R at IP address 10.4.1.1. The core switch 110R includes a first level table which terminates by forwarding the received packet to port two, link 160B, and destination pod two 112C. Switch 110I at IP address 10.2.2.1 belongs to the same pod as the destination subnet, and therefore has a first level table with a terminating prefix, 10.2.0.0/24, which points to the switch responsible for that subnet, which in this example is switch 110J at IP address 10.2.0.1 on port 0 and link 107I. Next, switch 110J delivers the packet to the destination host 105J at IP address 10.2.0.3.

In some embodiments, flow classification is used. The flow classification may be used in combination with the two-level routing tables or as an alterative to the two-level routing tables. When flow classification is implemented (as described further below), a switch, which includes a flow classifier (described below and depicted at FIG. 6), will forward one or more subsequent packets to the same host using the same path (e.g., via the same output port, link, etc.). The switches (e.g., the flow classifier of the switch) thus maintain a stream of packets from a source host to a destination host to avoid reordering the stream of packets sent from the source host to the destination host.

Flow classification may be performed in the switches of a pod to overcome instances of avoidable local congestion (e.g., when two flows compete for the same output port, even though another port that has the same cost to the destination is underused). A flow refers to a stream (e.g., a sequence) of packets with the same entries for a subset of fields in the packet headers (e.g., typically the same source IP address, destination IP addresses, destination transport port, time to live (TTL), and the like). In particular, a switch at a pod may identify that one or more subsequent packets belong to the same flow, and then forward packets of that flow on the same outgoing port of the switch. The switches of a pod may also periodically reassign one or more output ports to minimize any disparity between the aggregate flow capacities of different ports. For example, dynamic reassignment at a switch may include remapping the output port to a particular destination flow.

Although flow classification can be performed in a variety of ways, Table 4 depicts an example of pseudo code for performing flow classification.

TABLE 4

FLOW CLASSIFICATION PSEUDO CODE.

```
   // Call on every incoming packet
1  IncomingPacket(packet)
2  Begin
3     Hash source and destination IP fields of packet;
      // Have we seen this flow before?
4     if seen(hash) then
5        Lookup previously assigned port x;
6        Send packet on port x;
7     Else
8        Record the new flow f;
9        Assign f to the least-loaded upward port x;
10       Send the packet on port x;
11    End
12 End
   // Call every t seconds
13 RearrangeFlows( )
14 Begin
15    for i=0 to 2 do
16       Find upward ports pmax and pmin with the largest and
         smallest aggregate outgoing traffic, respectively;
17       Calculate D, the difference between pmax and pmin;
18       Find the largest flow f assigned to port pmax whose size
         is smaller than D;
19       if such a flow exists then
20          Switch the output port of flow f to pmin;
21       End
22    End
23 End
```

In some implementations, the distribution of transfer times and burst lengths of Internet traffic is long-tailed, and characterized by few large long-lived flows (responsible for most of the bandwidth consumption) and many small short-lived flows. To enhance the achievable bandwidth (e.g., bisection bandwidth) of a network, long flows of packets are scheduled to minimize overlap with one another. In some embodiments, a central flow scheduler may be used to schedule the so-called long flows based on information indicative of the status of all active large flows in the network. The central flow scheduler may be implemented separate from switches 110A-T. Alternatively, the switches 110A-T may each include a flow scheduler (described below and depicted at FIG. 6), one of which is designated the so-called "central" flow scheduler for the network 100. Although the above-description makes reference to an implementation using a central flow scheduler, other approaches may be used to implement a decentralized flow scheduling mechanism as well.

In some embodiments, a switch (e.g., a flow scheduler with the switch) at the edge layer may initially assign a new flow of packets to the least loaded port of a switch. However, as a flow of packets grows in size above a predetermined threshold, the switch (which includes a flow scheduler) sends one or more notification messages to the central flow scheduler. The central flow scheduler controls all large flows (e.g., the path including which routes through the network 100), which are active at any given instant in time. This notification message to the central flow scheduler acts as a request by the switch (e.g., flow scheduler 610 depicted at FIG. 6) for placement of that long flow in an un-contended path (e.g., a path with sufficient capacity to handle the long flow). In some implementations, the switch is not authorized to reassign a port assigned to a flow of packets, but the central flow scheduler is the entity with the authority to order that re-assignment.

The central flow scheduler may track all active large flows and assign the active large flows (e.g., a flow of packets exceeding a predetermined threshold) to non-conflicting paths if possible. For example, a flow that exceeds a threshold of 0.5 Gigabits per second for a given interval of time may be assigned to an output port with sufficient capacity to handle the large flow without creating a bottleneck. In some implementations, the central flow scheduler maintains the state for all links in the network signifying their availability to carry large flows (e.g., a given link may indicate yes a large flow can be handled or no a large flow cannot be handled).

Moreover, for inter-pod traffic, there are $(k/2)^2$ possible paths between any given pair of hosts in the network, and each of these paths corresponds to a core switch. When the central scheduler receives a notification of a new large flow, the central flow scheduler searches through the core switches to find one whose corresponding path components do not include a reserved link. Upon finding such a path, the central scheduler marks those links as reserved, and provides the relevant switches in the source pod with the correct outgoing port that corresponds to the flow's marked path. Large flows of packets associated with intra-pod traffic are similarly processed, although an un-contended path may need to be identified through an aggregation layer pod switch. In some implementations, the central flow scheduler garbage collects flows whose last update is older than a given time, clearing their reservations.

The redundancy of available paths between any pair of hosts provides the fat-tree topology with some degree of fault-tolerance. In some embodiments, a failure broadcast protocol is implemented to allow switches to route around a failure, such as a failure at a link or at a switch. Moreover, the failure may be one or two so-called "hops" away from the packet being routed by the switch. For example, in some implementations each switch in the fat-tree network 100 includes a fault detection mechanism (as depicted at fault tolerance module 614 of FIG. 6) to determine when a link or neighboring switch fails.

From a fault-tolerance perspective, two classes of failure can be handled. First, a fault between an edge layer switch and an aggregation layer switch inside a pod can be handled. Second, a fault between a core layer switch and an aggregation layer switch can be handled. Although the description is made with respect to link failures, the switch failures trigger the similar error messages (e.g., a Bidirectional Forwarding Detection session (BFD) alert) and elicit the similar responses.

In the case when there is a link failure between an edge layer switch and an aggregation layer switch, the link failure may affect three classes of traffic. First, outgoing inter-pod and intra-pod packet traffic originating from the edge layer switch may be affected. In this case, the switch (e.g., the local fault tolerance module 615) sets a "cost" of the failed link to infinity and does not assign to the failed link any additional (e.g., new) flows, and chooses another available aggregation layer switch. Second, intra-pod traffic using the aggregation layer switch as an intermediary is affected by the link failure. In response, the aggregation layer switch broadcasts a message notifying all other edge layer switches in the same pod of the link failure. The edge layer switches (e.g., the local fault tolerance module 615) in the pod may then check, when assigning new flows, whether the intended output port corresponds to one of those messages (e.g., tags) and avoid the link fault if possible. The third class of affected traffic is inter-pod packet traffic coming into the aggregation layer switch. The core switch connected to the aggregation layer switch has access to the pod only through the aggregation layer switch; therefore, the aggregation layer switch (e.g., the fault tolerance module 615) broadcasts a message to all its core switches signifying its inability to carry traffic to the edge layer switch's subnet. These core switches in turn forward the message to all connected aggregation layer switches. Finally, the aggregation layer switches avoid the single affected core switch when assigning new flows to that subnet.

A failure of a link from an aggregation layer switch to a core affects two classes of traffic. First, the failure of a link from an aggregation layer switch to a core affects outgoing inter-pod traffic, in which case the local routing table marks the affected link as unavailable and locally chooses another core switch. Second, a failure of a link from an aggregation layer switch to a core switch affects incoming inter-pod traffic. In this second case, the core switch (e.g., the fault tolerance module 615) broadcasts a tag message to all other directly connected aggregation layer switches to signify an inability to carry traffic to an at entire pod. As described above, these aggregation layer switches avoid (if possible) that core switch when assigning flows destined to that pod. When failed links and switches come back up, the failed links and switches are reactivated.

Figure 6:
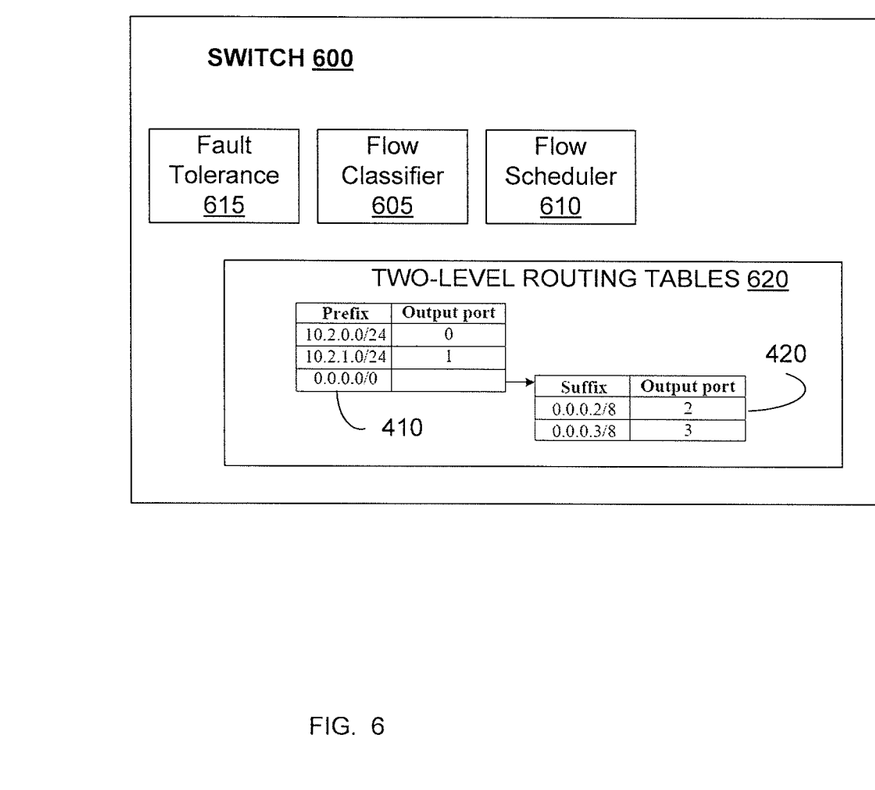
FIG. 6 depicts an example of a switch including the two-level routing tables.

FIG. 6 depicts a block diagram of a switch 600. Switch 600 includes a fault tolerance 615 module for performance the fault tolerance aspects described above, a flow classifier 605 module for classifying flows of packets as described above, a flow scheduler for scheduling long (e.g., large) flows of packets as described above, and two-level routing tables 620, as described above. Each of switches 110A-T may be implemented using switch 600. However, the core switches may not include the second level table 420. Moreover, in the case of flow scheduling, one of the switches may include a flow scheduler designated the central flow scheduler described above.

Figure 7:
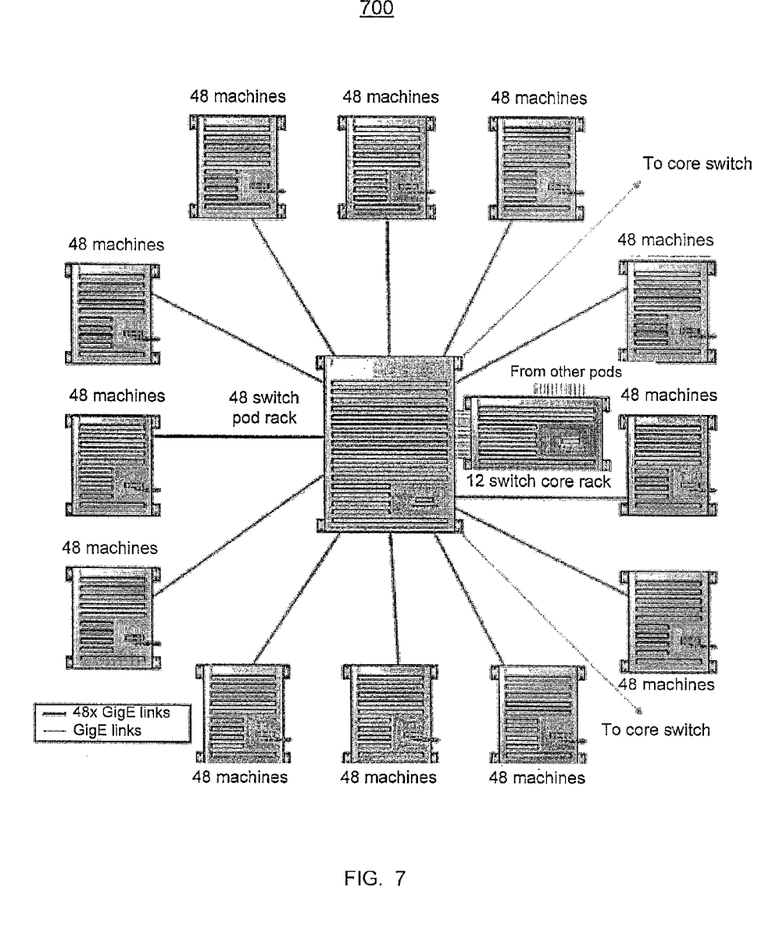
FIG. 7 depicts an example of a packaging and wiring scheme for a fat-tree network.

FIG. 7 depicts an example of a packaging and wiring scheme for use with a fat-tree network 700. The packaging and wiring scheme may, in some cases, eliminate half of the required wiring and reduces the overall length of required cabling, which simplifies cluster management of network 100 and reduces the total cost.

The following example of a packaging technique is described using the example of a fat-tree network including 27,648 hosts in the cluster and 48-port Ethernet switches, although the packaging technique may be used with other sizes of fat-tree networks. Each individual pod is a replication unit for the larger cluster, as depicted at FIG. 7. Each pod thus includes 576 hosts and 48 individual 48-port Gigabit Ethernet switches. In some implementations, each host takes up to about 1 rack unit in a standard 19 inch rack, and each rack can accommodate 48 hosts. Thus, each pod consists of 12 racks with 48 hosts each.

The 48 switches that make up the edge and aggregation layers of the fat-tree in each pod are placed in a centralized rack. However, we assume the ability to package the 48 switches into a single monolithic unit with 1,152 user-facing ports, which is referred to as a "pod switch." Of these 1,152 user-facing ports, 576 of the ports connect directly to the machines in the pod, corresponding to connectivity at the edge layer. Another 576 ports fan out to one port on each of the 576 switches to make up the top layer in the fat-tree. The other 1,152 ports are wired internally in the pod switch to account for the required interconnect between the edge and aggregation layers of the fat-tree network.

The 576 core switches that form the top of the fat-tree network are distributed across the individual pods. In a topology with 27,648 total hosts, there are 48 total pods, each housing 12 of the required core switches. Of the 576 cables fanning out from each pod switch to the core, 12 will connect directly to core switches placed nearby in the same pod. The remaining cables would fan out, in sets of 12, to core switches housed in remote pods.

To minimize total cable length, racks are placed around the pod switch in two dimensions, as shown in FIG. 7. This arrangement reduces cable lengths, when compared to a relatively linear layout of individual racks in a pod. Similarly, pods are arranged in a 7×7 grid (with one missing spot) to accommodate all 48 pods. Once again, this grid layout will reduce inter-pod cabling distance to appropriate interconnect core switches and will support some standardization of cable lengths and packaging to support inter-pod connectivity.

In some implementations, the switches were not collected into a central rack. In this approach, two 48 port switches are distributed to each rack. Hosts would interconnect to the switches in sets of 24. This approach has the advantage, in some implementations, of requiring much shorter cables to connect hosts to their first hop switch and for eliminating these cables all together if the racks were appropriately internally packaged.

The subject matter described herein may be embodied in systems, apparatus, methods, and/or articles depending on the desired configuration. In particular, various implementations of the subject matter described may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. For example, a switch may include a switch fabric to perform switching, a processor and a memory for controlling switching and for storing the first and second tables.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

In some embodiments, the fat-tree topology 100 of FIG. 1 is implemented as a so-called "partial" fat-tree (e.g., not using a full complement of pods, one or more pods may not be fully populated with switches or hosts). When the partial fat-tree is implemented, the above-noted systems and methods continue to be operative. In some implementations, the two-level table, the flow classifier, and flow scheduler provides multipath routing in a manner that prevents (or reduces to an acceptable level) packet re-ordering and maximizes bisection bandwidth.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
receiving, at a switch, a packet comprising an internet protocol packet, the switch coupled to a plurality of switches configured as a fat-tree network, the packet destined for a host at a destination address, the destination address comprising a first identifier, a second identifier, and a third identifier, the first identifier representative of a pod coupled to the host, the second identifier representative of a destination switch coupled to the host, and the third identifier representative of the host;
determining, at the switch from a first level table comprising a plurality of prefixes, a prefix matching a first portion of the destination address of the received packet;
determining, at the switch from a second level table comprising a plurality of suffixes, a suffix matching a second portion of the destination address of the received packet, when the matching prefix of the first level table is associated with the second level table; and
forwarding, by the switch based on the first level table and the second level table, the received packet to an output port of the switch.

2. The method of claim 1, wherein the first level table is used to forward the received packet towards the host coupled to the plurality of switches configured as the fat-tree network, and the second level table is used to forward the received packet towards a higher-level core switch.

3. The method of claim 1, wherein determining, from the first level table, further comprises:
determining the prefix by determining a longest matching prefix from the plurality of prefixes of the first level table, the prefix representing one or more most significant bytes of the destination address.

4. The method of claim 1, wherein forwarding further comprises:
forwarding, by the switch using the first level table and the second table, the received packet to a first output port of the switch, the switch implemented as an edge switch, the first output port coupled to an aggregation switch and mapped to the matching prefix; and
forwarding, by the aggregation switch using the first level table and the second table, the received packet to a second output port at the aggregation switch, the second output port coupled to a core switch and mapped to the matching suffix.

5. The method of claim 1 further comprising:
generating the first level table to include one or more prefixes, the prefixes representing a route.

6. The method of claim 1 further comprising:
generating the second level table to include one or more suffixes, the suffixes representing a route.

7. The method of claim 1, further comprising:
generating the second level table to include one or more suffixes, each of the suffixes representing a host identifier.

8. The method of claim 1 further comprising:
configuring the plurality of switches of the pod to include one or more edge switches coupled to one or more aggregation switches, the aggregation switches of the pod further coupled to one or more core switches, wherein the edge switches, the aggregation switches, and the core switches are configured as the fat-tree network.

9. The method of claim 8 further comprising:
implementing the one or more edge switches, the one or more aggregation switches, and the one or more core switches using the fat-tree network configuration with respect to a quantity of ports per switch and a capacity of each of the ports.

10. The method of claim 8 further comprising:
implementing at least one of the edge switches, at least one of the aggregation switches, and at least one of the core switches using the fat-tree network configuration with respect to a quantity of ports per switch and a capacity of each of the ports.

11. The method of claim 1 further comprising:
forwarding, to one of the output ports of the switch, one or more packets associated with a flow to maintain a sequence of the packets;
scheduling one or more packets associated with a flow; and monitoring the plurality of switches for a fault.

12. A system comprising:
a switch configured to receive one or more packets comprising one or more internet protocol packets, the packet destined for a host at a destination address, the destination address comprising a first identifier, a second identifier, and a third identifier, the first identifier representative of a pod coupled to the host, the second identifier representative of a destination switch coupled to the host, and the third identifier representative of the host, the switch coupled to a plurality of switches, the plurality of switches configured as the pod of a fat-tree network, the switch further configured to determine from a first level table comprising a plurality of prefixes, a prefix matching a first portion of a destination address of the received packet, determine from a second level table comprising a plurality of suffixes, a suffix matching a second portion of the destination address of the received packet, when the matching prefix of the first level table is associated with the second level table, and forward the one or more packets based on a first level table and a second level table, wherein the first level table is used to forward the received packet towards a host coupled to the plurality of switches configured as the fat-tree network, and wherein the second level table is used to forward the received packet towards a higher-level core switch.

13. The system of claim 12, wherein the first level table further comprises:
one or more prefixes representing a route.

14. The system of claim 12, wherein the second level table further comprises:
one or more suffixes, the suffixes representing a route.

15. The system of claim 12, wherein the second level table further comprises:
one or more suffixes, each of the suffixes representing a host identifier.

16. A network comprising:

a plurality of switches configured as a fat-tree network, the fat-tree network providing communications to a cluster of computers at a data center, each of the plurality of switches including a fat-tree network configuration with respect to a quantity of ports per switch and a capacity of each of the ports, wherein the communications comprises a plurality of internet protocol packets, wherein the plurality of switches include at least one switch configured to determine from a first level table comprising a plurality of prefixes, a prefix matching a first portion of a destination address of the received packet, the packet destined for a host at a destination address, the destination address comprising a first identifier, a second identifier, and a third identifier, the first identifier representative of a pod coupled to the host, the second identifier representative of a destination switch coupled to the host, and the third identifier representative of the host, determine from a second level table comprising a plurality of suffixes, a suffix matching a second portion of the destination address of the received packet, when the matching prefix of the first level table is associated with the second level table, and forward the one or more packets based on a first level table and a second level table wherein the first level table is used to forward the received packet towards a host coupled to the plurality of switches configured as the fat-tree network, and the second level table is used to forward the received packet towards a higher-level core switch.

17. The network of claim 16 further comprising:

configuring the plurality of switches to include one or more edge switches coupled to one or more aggregation switches, the aggregation switches further coupled to one or more core switches, wherein the edge switches, the aggregation switches, and core switches are configured as the fat-tree network.

18. The network of claim 17 further comprising:

implementing the one or more edge switches, the one or more aggregation switches, and the one or more core switches using the fat-tree network configuration with respect to a quantity of ports per switch and a capacity of each of the ports.

19. A system comprising:

a plurality of switches configured as a fat-tree network providing a plurality of paths to a cluster of computers at a data center, the plurality of switches configured to deliver, from a source to a destination, a plurality of packets comprising a plurality of internet protocol packets in order on a per flow basis, and the plurality of switches configured to distribute flows among the plurality of paths, wherein each of the plurality of switches are configured to determine from a first level table comprising a plurality of prefixes, a prefix matching a first portion of a destination address of the received packet, wherein the destination address comprises an internet protocol destination address, the packet destined for a host at the destination address, the destination address comprising a first identifier, a second identifier, and a third identifier, the first identifier representative of a pod coupled to the host, the second identifier representative of a destination switch coupled to the host, and the third identifier representative of the host, determine from a second level table comprising a plurality of suffixes, a suffix matching a second portion of the destination address of the received packet, when the matching prefix of the first level table is associated with the second level table, and forward the one or more packets based on a first level table and a second level table wherein the first level table is used to forward the received packet towards a host coupled to the plurality of switches configured as the fat-tree network, and the second level table is used to forward the received packet towards a higher-level core switch.

20. The system of claim 19 further comprising:

using a second level table to distribute flows among the plurality of paths, the second level table comprising one or more suffixes representing a host identifier.

* * * * *

UNITED STATES PATENT AND TRADEMARK OFFICE
CERTIFICATE OF CORRECTION

| | | |
|---|---|---|
| PATENT NO. | : 8,483,096 B2 | Page 1 of 1 |
| APPLICATION NO. | : 12/177860 | |
| DATED | : July 9, 2013 | |
| INVENTOR(S) | : Vahdat et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

Signed and Sealed this
Tenth Day of February, 2015

Michelle K. Lee
*Deputy Director of the United States Patent and Trademark Office*